United States Patent [19]
Sakata et al.

[11] Patent Number: 5,087,971
[45] Date of Patent: Feb. 11, 1992

[54] VIDEO IMAGE DISPLAY PROCESSOR

[75] Inventors: Takashi Sakata; Toshiharu Yumoto, both of Nagano, Japan

[73] Assignee: Fuji Photo Film Co., Ltd., Kanagawa, Japan

[21] Appl. No.: 603,044

[22] Filed: Oct. 25, 1990

[30] Foreign Application Priority Data

Oct. 27, 1989 [JP] Japan .................................. 1-281485

[51] Int. Cl.⁵ .......................... H04N 7/18; H04N 5/14
[52] U.S. Cl. ..................................... 358/160; 358/140
[58] Field of Search ............... 358/140, 160, 150, 148, 358/230

[56] References Cited

U.S. PATENT DOCUMENTS

| 4,611,225 | 9/1986 | Powers ................................. 358/140 |
| 4,816,909 | 3/1989 | Kimura et al. ........................ 358/98 |
| 4,953,025 | 8/1990 | Saitoh et al. ..................... 358/230 X |

Primary Examiner—Victor R. Kostak
Attorney, Agent, or Firm—Sughrue, Mion, Zinn Macpeak & Seas

[57] ABSTRACT

A video signal processing device is incorporated in an image output device such as a thermal printer which is connected to an analog video signal source such as a computerized medical diagnostic imaging system, e.g., a CT scanner. The video signal processing device has a memory which stores data for determining the total number of horizontal pixels along a single horizontal line in a frame based on the number of frames to be displayed on a display unit or recorded on a recording medium, and the aspect ratio of the frames, and data for determining the frequency of the sampling pulses supplied to an A/D converter based on the total number of horizontal pixels and the number of scanning lines of the analog video signal. Based on the data stored in the memory, a processor supplies sampling pulses to the A/D converter depending on input and output conditions which are entered through a control panel by the operator. The video output device can easily display or record desired image information in a single frame or a plurality of frames on a display unit or a recording medium.

3 Claims, 7 Drawing Sheets

FIG.2

40 TABLE FOR DETERMININIG TOTAL NUMBER OF HORIZONTAL PIXELS

| FORMAT \ ASPECT RATIO | 3:4 | 1:1 | 7:8 |
|---|---|---|---|
| 1 FRAME/SHEET | 1280 PIXELS | 1024 | 1094 |
| 2 FRAMES/SHEET | 1088 | 870 | 930 |
| 4 FRAMES/SHEET | 1280 | 1024 | 1094 |
| 6 FRAMES/SHEET | 1088 | 870 | 930 |

FIG.3

42 TABLE FOR DETERMINING SAMPLING FREQUENCY

| TYPE | NUMBER OF SCANNING LINES | TOTAL NUMBER OF HORIZONTAL PIXELS | | | | | | |
|---|---|---|---|---|---|---|---|---|
| | | 1280 | 1094 | 1088 | 1024 | 930 | 870 | |
| $A_1$ | 480 | $D_{11}$ | $D_{12}$ | $D_{13}$ | $D_{14}$ | $D_{15}$ | $D_{16}$ | |
| $A_2$ | 496 | $D_{21}$ | $D_{22}$ | $D_{23}$ | $D_{24}$ | $D_{25}$ | $D_{26}$ | |
| $A_3$ | 512 | $D_{31}$ | $D_{32}$ | $D_{33}$ | $D_{34}$ | $D_{35}$ | $D_{36}$ | |
| $A_4$ | 592 | $D_{41}$ | $D_{42}$ | $D_{43}$ | $D_{44}$ | $D_{45}$ | $D_{46}$ | |
| $A_5$ | 608 | $D_{51}$ | $D_{52}$ | $D_{53}$ | $D_{54}$ | $D_{55}$ | $D_{56}$ | |
| $A_6$ | 640 | $D_{61}$ | $D_{62}$ | $D_{63}$ | $D_{64}$ | $D_{65}$ | $D_{66}$ | |
| $A_7$ | 960 | $D_{71}$ | $D_{72}$ | $D_{73}$ | $D_{74}$ | $D_{75}$ | $D_{76}$ | |
| $A_8$ | 992 | $D_{81}$ | $D_{82}$ | $D_{83}$ | $D_{84}$ | $D_{85}$ | $D_{86}$ | |
| $A_9$ | 1024 | $D_{91}$ | $D_{92}$ | $D_{93}$ | $D_{94}$ | $D_{95}$ | $D_{96}$ | |
| $A_{10}$ | 1056 | $D_{101}$ | $D_{102}$ | $D_{103}$ | $D_{104}$ | $D_{105}$ | $D_{106}$ | |
| $A_{11}$ | 1088 | $D_{111}$ | $D_{112}$ | $D_{113}$ | $D_{114}$ | $D_{115}$ | $D_{116}$ | |
| $A_{12}$ | 800 | $D_{121}$ | $D_{122}$ | $D_{123}$ | $D_{124}$ | $D_{125}$ | $D_{126}$ | |
| $A_{13}$ | 832 | $D_{131}$ | $D_{132}$ | $D_{133}$ | $D_{134}$ | $D_{135}$ | $D_{136}$ | |
| COMPOSITE VIDEO SIGNAL | | | | | | | | RGB |
| ANALOG VIDEO SIGNAL | | | | | | | | |

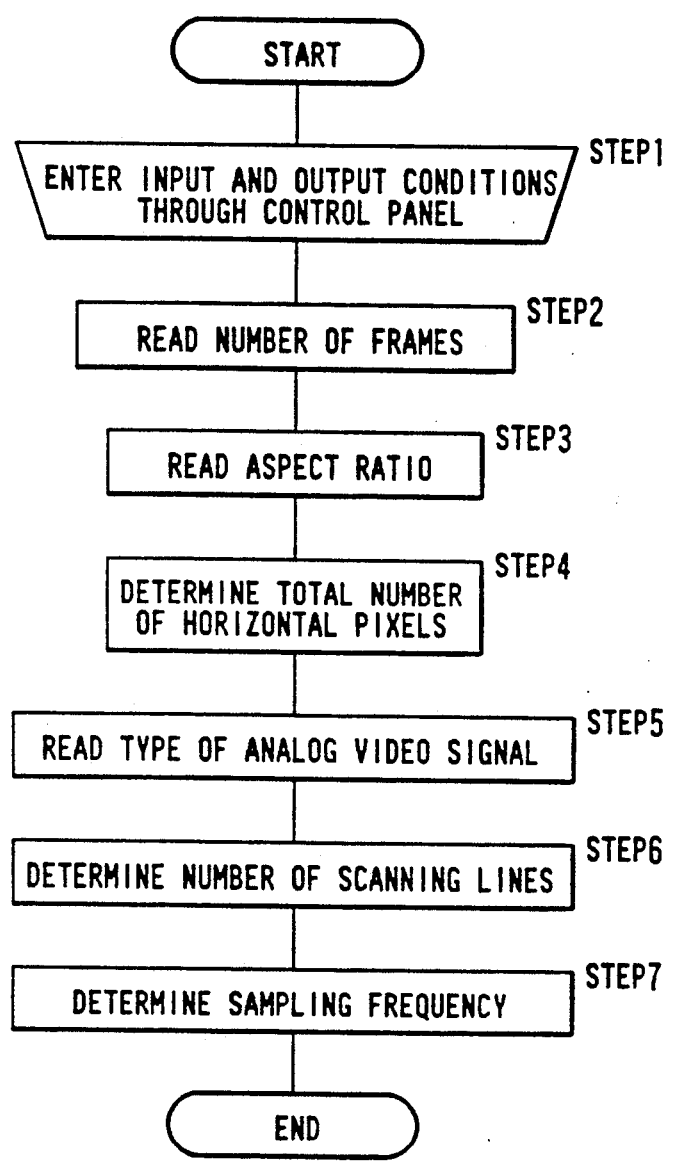

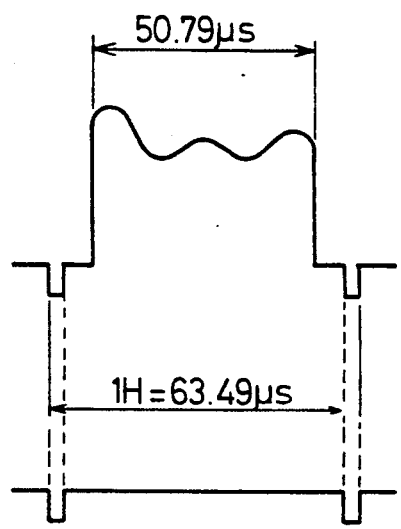
FIG.6a ANALOG VIDEO SIGNAL
FIG.6b HORIZONTAL SYNCHRONIZING SIGNAL

VIDEO IMAGE DISPLAY PROCESSOR

BACKGROUND OF THE INVENTION

1. Field of the Invention:

The present invention relates to a video signal processing device for converting an analog video signal from a video signal source into a digital video signal based on preset input and output conditions.

2. Prior Art:

Computerized medical diagnostic imaging systems such as CT scanners are capable of forming images of internal local regions of human bodies. The image information produced by such imaging systems is highly convenient for doctors because it can provide a clear view of the internal structure of the human body. A CT scanner employs a CRT or the like for displaying obtained image information, based on which the doctor makes a medical diagnosis of the examined human body. The image information displayed on the CRT may be thermally recorded on a heat-sensitive medium, thereby producing a hard copy which may be available for medical diagnosis at any time and in any place. An image signal, which represents image information and is supplied from an image signal source such as a CT scanner, is usually applied as an analog video signal to an image output device such as a thermal printer or the like. The image output device converts the applied analog video signal into recording data to be thermally printed, and then records the data on a heat-sensitive medium through a thermal head.

There are known various known computerized medical diagnostic imaging systems which supply analog video signals to image output devices. They include, in addition to a CT scanner, a nuclear magnetic resonance imaging system and other imaging systems. Analog video signals produced by these different types of computerized medical diagnostic imaging systems may have different number of scanning lines, or may have different aspect ratios for reproduced images, even if they have the same number of scanning lines.

When a reproduced image is to be produced, it may be desirable to record image information represented by a plurality of frames on a single recording medium. Such a multiple image format is advantageous especially when image information in a plurality of frames in the vicinity of a certain body region to be diagnosed is observed for greater accuracy of diagnosis.

Therefore, images to be produced have different dimensions when analog video signals have different numbers of scanning lines, different aspect ratios, and different number of frames to be reproduced on a signal recording medium.

When a recorded image is to be produced by an image output device, therefore, it is necessary to produce recording data to be thermally recorded, taking into account an input condition represented by the number of scanning lines of an analog video image, and output conditions represented by the number of frames to be recorded on a recording medium and an aspect ratio of the recorded image.

To meet the above requirement, the analog video signal which is applied to an A/D converter of the image output device must be converted into a digital video signal with sampling pulses which have frequency determined depending on the number of scanning lines, the number of frames, and the aspect ratio, as referred to above. If the frequency of sampling pulses is inappropriate, then the reproduced image may be expanded or reduced horizontally in size.

Heretofore, once the type of an analog video image source, the number of frames to be recorded, and an aspect ratio of an image to be recorded are given, the frequency of sampling pulses is determined by the operator through manual adjustments of a rheostat connected to a voltage-controlled oscillator (VCO) while the operator observes the image as it is recorded. According to another conventional practice, the number of sampling pulses contained in one period (1H) of a horizontal synchronizing signal is manually adjusted to determine the frequency of sampling pulses by the operator while observing the image as it is recorded.

According to these known manual processes, however, the setting of the rheostat or the selection of the number of sampling pulses to be contained in one period (1H) of the horizontal synchronizing signal has to be determined on a trial-and-error basis by the operator while viewing the image being recorded. Therefore, the manual determination of the frequency of sampling pulses has been quite troublesome and time-consuming. Such an adjustment operation must be carried out each time the image output device is connected to a different analog video signal source or an image is to be reproduced in a different number of frames. As a consequence, it has been difficult or cumbersome to display or record images while matching various different conditions.

SUMMARY OF THE INVENTION

It is a principal object of the present invention to provide a video signal processing device which allows an image output device to easily display or record image information in one frame or a plurality of frames on an image display or image medium.

Another object of the present invention is to provide a video image processing device which has a memory means for storing data with respect to the frequencies of sampling pulses that are to be supplied to an A/D converting means, depending on the number of scanning lines, the number of frames, and aspect ratios, so that the video image processing device can easily convert analog video signals from various video signal sources into corresponding digital video signals based on the data stored in the memory means.

According to the present invention, there is provided a video signal processing device for processing image information to be displayed in a single frame or a plurality of frames on a display unit or recorded in a single frame or a plurality of frames on a recording medium, the video signal processing device comprising A/D converting means for converting an analog video signal into a digital video signal with sampling pulses, memory means to storing data for determine the total number of horizontal pixels along a single horizontal line in a frame based on the number of frames to be displayed on the display unit or recorded on the recording medium, and the aspect ratio of the frames, and data for determining the frequency of the sampling pulses supplied to the A/D converting means based on the total number of horizontal pixels and the number of scanning lines of the analog video signal, and processing means for supplying sampling pulses having the determined frequency to the A/D converting means based on the data stored in the memory means.

The processing means includes a D/A converter for converting the data stored in the memory means into an analog voltage signal, and a voltage-controlled oscillator for generating the sampling pulses based on the analog voltage signal.

The processing means comprises a PLL frequency synthesizer for generating the sampling pulses based on the data stored in the memory means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a diagram showing a table for determining the total numbers of horizontal pixels, the table being stored in a memory in the video signal processing device shown in FIG. 1;

FIG. 3 is a diagram showing a table for determining sampling frequencies, the table being stored in the memory in the video signal processing device shown in FIG. 1;

FIG. 5 is a flowchart of a program stored in a ROM in a processor in the video signal processing device shown in FIG. 1;

FIGS. 6a and 6b are timing chart showing the relationship between an analog video signal and a horizontal synchronizing signal.

DETAILED DESCRIPTION OF THE PREFERRED EMBODIMENTS

Figure 1:
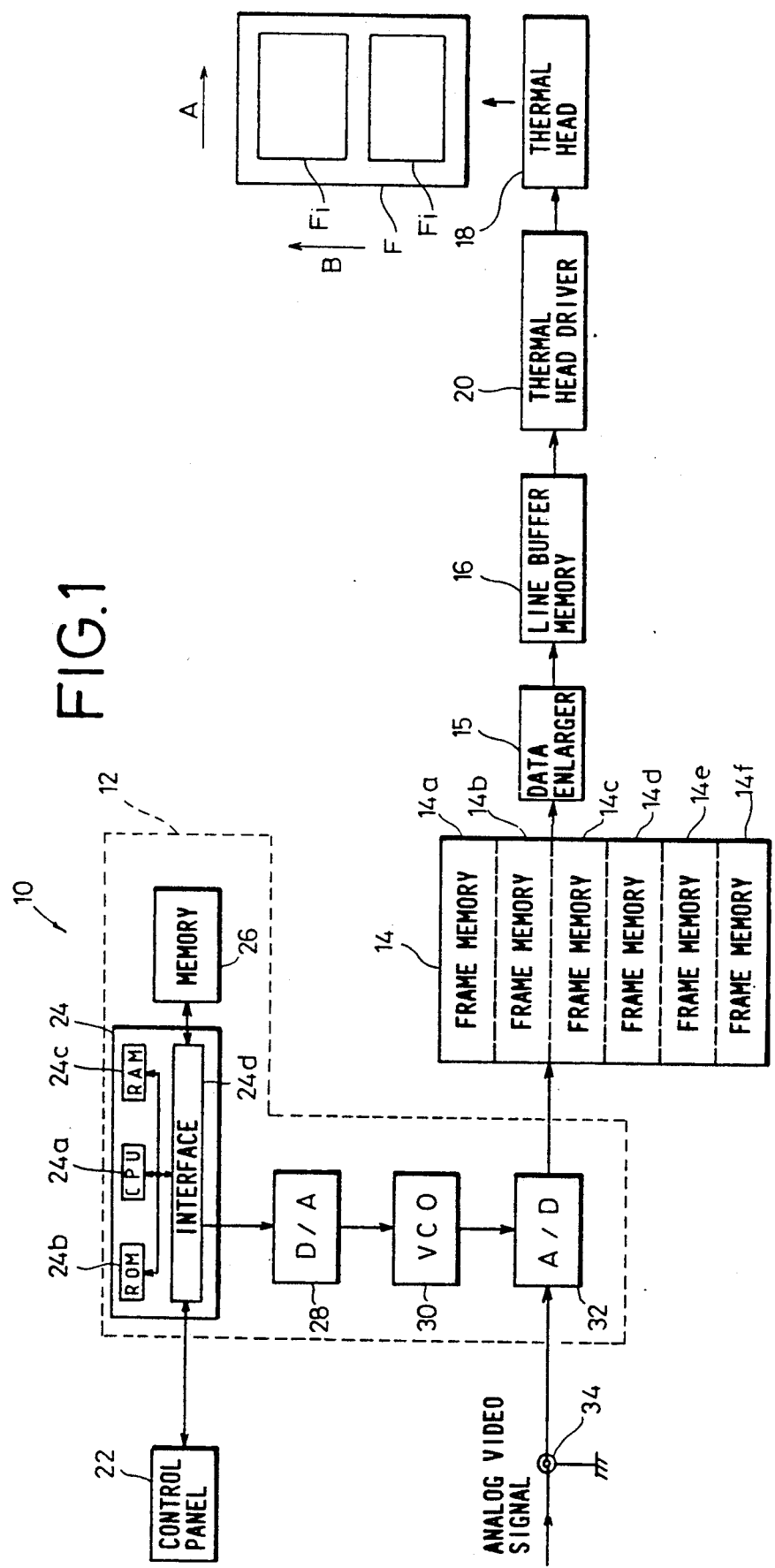
FIG. 1 is a block diagram of a thermal printer which incorporates a video signal processing device according to an embodiment of the present invention.
Figure 4A:
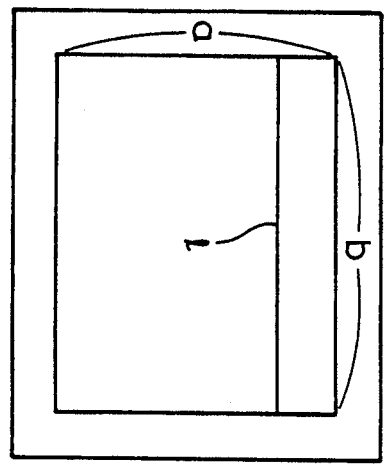
FIGS. 4(a) through 4(d) are diagrams showing various formats in which frames are recorded on a single heat-sensitive medium.
Figure 4B:
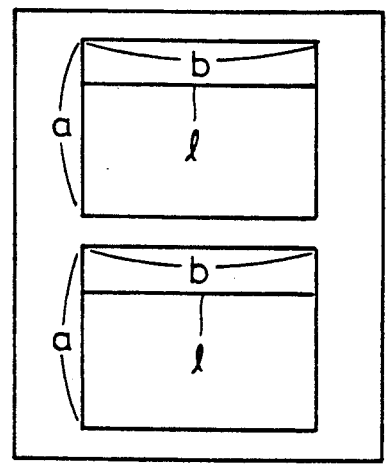
Figure 4C:
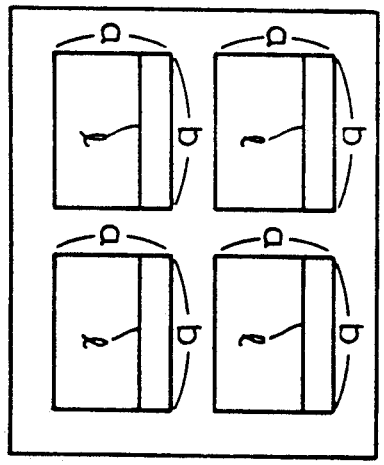
Figure 4D:
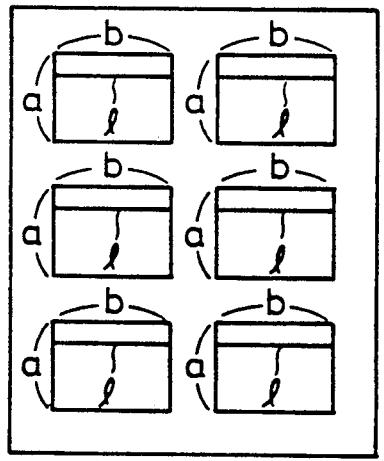

FIG. 1 shows a thermal printer, generally designated by the reference numeral 10, which incorporates a video signal processing device according to an embodiment of the present invention. The thermal printer 10 generally comprises a video signal processing device 12, a frame memory assembly 14 composed of six frame memories 14a through 14f for storing respective frames of image information represented by a digital video signal which has been converted from an analog video signal of a type An (n=1~13) that is applied to the video signal processing device 12, a line buffer memory 16 for storing digital image data corresponding to one line along a main scanning direction A on a heat-sensitive medium F, out of the image information stored in the frame memory assembly 14, and a thermal head driver 20 for converting the one-line digital image data from the line buffer memory 16 into a signal which drives a thermal head 18 which comprises a linear array of heating elements arranged in the main scanning line A.

The thermal printer 10 has a control panel 22 for entering, into the video signal processing device 12, output conditions represented by the number of frames to be recorded on a single heat-sensitive medium F and the aspect ratio of the frames, and an input condition represented by the type of a video signal source connected to the thermal printer, i.e., the number of scanning lines of the analog video signal which is applied from the video signal source to the thermal printer.

The information as to the input and output conditions from the control panel 22 is introduced into a processor (processing means) 24 of the video image processing device 12, the processor 24 comprising a CPU 24a, a ROM 24b, a RAM 24c, and an interface 24d. Depending on the applied input and output conditions, the processor 24 reads information regarding a sampling frequency from a memory 26 which may comprise a floppy disk, an IC memory, or the like, and sends the sampling frequency information through a D/A converter 28 to a voltage-controlled oscillator (VCO) 30. The VCO 30 then supplies an A/D converter 32 with sampling pulses which has the sampling frequency based on the supplied information.

The A/D converter 32 converts the applied analog video signal into a digital video signal based on the supplied sampling pulses, and delivers the digital video signal to the frame memory assembly 14.

The memory 26 stores a table 40 of data for determining the total numbers of horizontal pixels shown in FIG. 2 and a table 42 of data for determining sampling frequencies shown in FIG. 3.

The table 40 contains data for determining the total numbers of horizontal pixels based on a format and an aspect ratio. In the table 40, the format represents the number of frames to be recorded on a single recording sheet F as the recording medium, and the aspect ratio represents the ratio of the height a to the width b of each frame.

As shown in FIG. 2, the table 40 has four formats, i.e., 1 frame per sheet, 2 frames per sheet, three frames per sheet, and 4 frames per sheet, and three aspect ratios, i.e., 3:4, 7:8, and 1:1. Once a format and an aspect ratio are given, they determine the total number of pixels along a single horizontal line in a frame of image information which is stored in the frame memory 14.

In order to record images on a single image recording sheet in a well-balanced layout in each of the formats, the images are oriented in different directions between the formats of 1 and 4 frames per sheet and the formats of 2 and 6 frames per sheet, as shown in FIG. 4. In the formats of 1 and 2 frames per sheet, the number of pixels along a singe horizontal line 1 in an image or images to be recorded on the heat-sensitive medium is respectively 2 times and 1.5 times the total number of horizontal pixels shown in FIG. 2, in order to enlarge the size of the image or images. The number of pixels can be increased by a data enlarger 15 shown in FIG. 1.

The number of scanning lines in FIG. 3 are the number of scanning lines of composite video signals of types $A_1$ through $A_{11}$ transmitted from the analog video signal source and RGB signals of types $A_{12}$, $A_{13}$. In this embodiment, the number of scanning lines represents the number of scanning lines contained in an image to be recorded on the heat-sensitive medium F, out of the total number of scanning lines per frame. The total number of horizontal pixels in FIG. 3 are those values which are obtained from the table 40 shown in FIG. 2. Therefore, when one of the analog video signal types $A_1$ through $A_{13}$, i.e., an analog video signal source, is determined from the table 42, and the total number of horizontal pixels is determined from the table 40, a sampling frequency is automatically determined. Denoted in FIG. 3 at $D_{11}$, $D_{12}$, ..., $D_{136}$ are digital data depending on the number of scanning lines and the total number of horizontal lines and applied to the D/A converter 28. When the digital data are converted into an analog voltage signal by the D/A converter 28, the VCO 30 produces sampling pulses having a sampling frequency corresponding to the analog voltage signal and applies the sampling pulses to the A/D converter 32.

For example, it is assumed that an analog video signal of the type $A_2$ has a total of 525 scanning lines per frame, 496 scanning lines to be recorded on the heat-sensitive medium F, and a frame frequency of 30 frames/second. With this analog video signal, the period of a single horizontal line, i.e., the period (1H) of a horizontal synchronizing signal, is $1/(525 \times 30)$ second = 63.49 μs. If the period in which an image to be recorded is contained is 50.79 μs as shown in FIG. 6 at (a), then the sampling frequency for a total of 1088 horizontal pixels is $1/(50.79 \mu s + 1088) = 21.42$ MHz. Therefore, the digital data $D_{23}$ shown in FIG. 3 are digital data for causing the VCO 30 to oscillate at the frequency of 21.42 MHz.

FIG. 5 shows a flowchart of an operation sequence of the video signal processing device 12, in the form of a program stored in the ROM 24b of the processor 24. Operation of the thermal printer 10 will now be described below with reference to the flowchart of FIG. 5.

The operator of the thermal printer 10 first connects a desired analog video signal source to an input terminal 34 of the thermal printer 10. The operator then manipulates the control panel 22 to enter input and output conditions, i.e., information with respect to the type (e.g., $An = A_2$) of an analog video signal which will be transmitted from the connected analog video signal source, the number (e.g., 2) of frames to be recorded on a single heat-sensitive medium F, and the aspect ratio (e.g., 3:4) of the frames, in a step 1. The processor 24 stores the information as to the type of the analog video signal, the information as to the number of frames, and the information as to the aspect ratio into the RAM 24c.

Then, the CPU 24a reads the information as to the number of frames from the RAM 24c in a step 2, and also the information as to the aspect ratio from the RAM 24c in a step 3. Based on these items of information, the CPU 24a determines the total number of horizontal pixels from the table 40 which is stored in the memory 26 in a step 4. Since the number of frames to be recorded on a single sheet is 2 and the aspect ratio is 3:4, the CPU 24a determines the total number of horizontal pixels as 1088 from the table 40.

Then, the CPU 24a reads the type of analog video signal from the RAM 24c in a step 5. Since the transmitted analog video signal is of the type $A_2$, it is determined from the table 42 that the number of scanning lines is 496 in a step 6.

The CPU 24a then determines data $D_{23}$ corresponding to information with respect to a sampling frequency to be sent to the D/A converter 28, from table 42 in step 7.

The data $D_{23}$ are delivered to the D/A converter 28 and converted thereby into an analog voltage, which is then converted into sampling pulses of a given frequency by the VCO 30. The sampling pulses are then applied to a clock input terminal of the A/D converter 32. Thereafter, the operator operates on the control panel 22 to command the storage of the analog video signal. The transmitted analog video signal of the type $A_2$ is then stored into frame memories 14a, 14b, for example, of the frame memory assembly 14 depending on the number of frames (2 frames per sheet) and the aspect ratio (3:4).

The data stored in the frame memories 14a, 14b are then successively delivered, one horizontal scanning line at a time, through the data enlarger 15 into the line buffer memory 16 which has memory addresses corresponding to one line in the main scanning direction A on the heat-sensitive medium F and also to the linearly arranged heating elements of the thermal head 18. Inasmuch as the format is 2 frames per sheet, the number of pixels is increased to 1.5 times by the data enlarger 15. The scanning line of data stored in the line buffer memory 16 is then converted by the thermal head driver 20 into pulse signals, which are then applied to the thermal head 18. In response to the applied pulse signals, the thermal head 18 is energized to scan the heat-sensitive medium F in the main scanning direction A, thereby printing the corresponding line of a desired image on the heat-sensitive medium F. At the same time, the heat-sensitive medium F is fed in an auxiliary scanning direction B normal to the main scanning direction A by a feed system (not shown), so that images Fi (FIG. 1) are two-dimensionally recorded in the selected format on the heat-sensitive medium F.

In the above operation sequence, the format of 2 frames per sheet is selected. If the format of 1 frame per sheet is selected, then the number of pixels is increased twice by the data enlarger 15, and if the formats of 4 and 6 frames per sheets are selected, then the number of pixels is not increased by the data enlarger 15, and the data from the frame memory assembly 14 simply passes through the data enlarger 15 with pixel data enlargement. If the formats of 1 and 4 frames per sheets are selected, then since the main scanning line A on the heat-sensitive medium F is different from the direction of scanning lines of the images, vertical lines of data, rather than scanning lines of data, are delivered, one at a time, from the frame memory assembly 14 to the line buffer memory 16.

Figure 7:
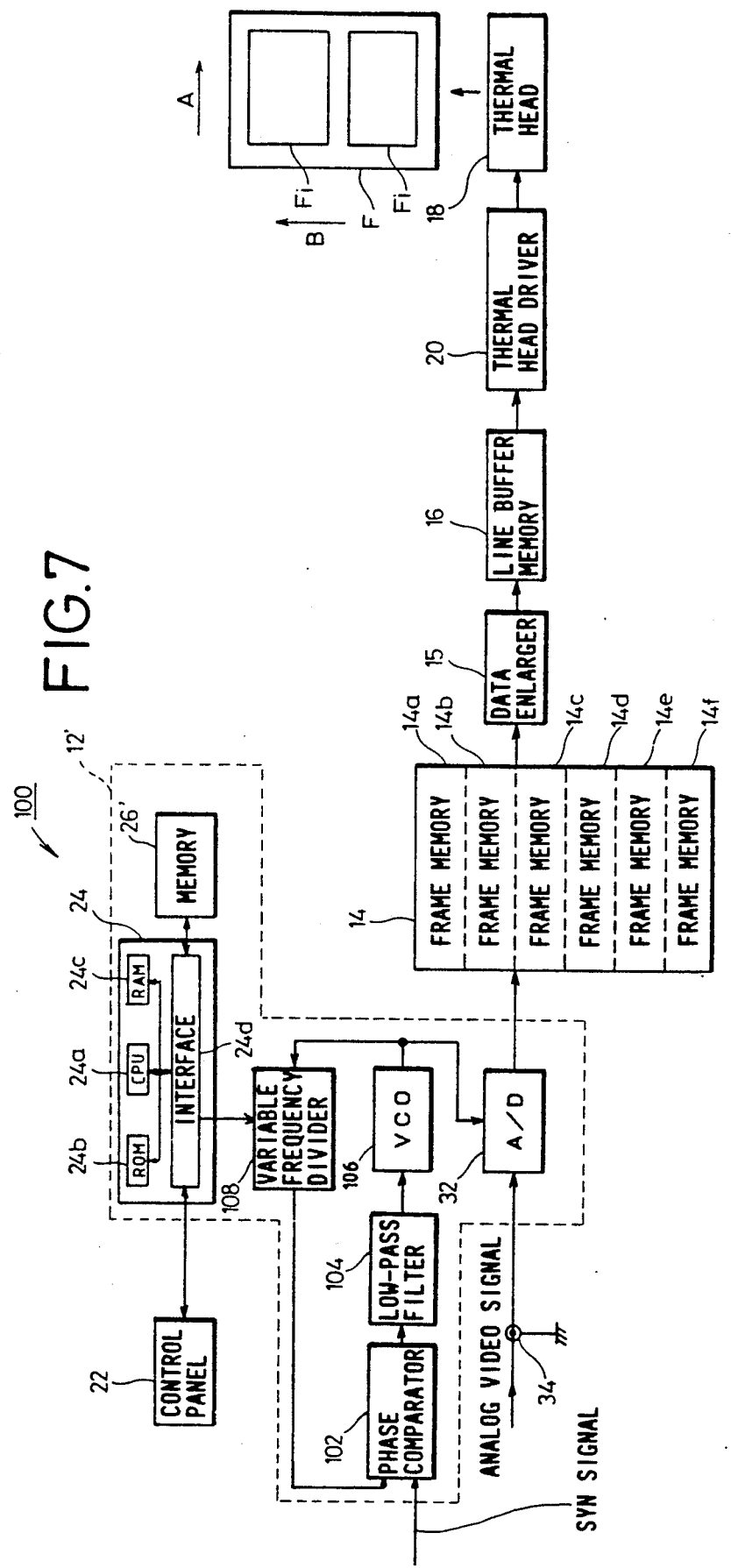
FIG. 7 is a block diagram of a thermal printer which incorporates a video signal processing device according to another embodiment of the present invention.

FIG. 7 shows a thermal printer 100 which incorporates a video signal processing device 12' according to another embodiment of the present invention. The thermal printer 100 differs from the thermal printer 10 shown in FIG. 1 in that the D/A converter 28 and the VCO 30 in FIG. 1 are replaced with a frequency synthesizer with a PLL for generating sampling pulses. Those parts shown in FIG. 7 which are identical to those shown in FIG. 1 are denoted by identical reference numerals, and will not be described in detail below.

The frequency synthesizer includes a phase comparator 102 having a reference signal input terminal supplied with a horizontal synchronizing signal (see FIG. 6 at (b)) The phase comparator 102 applies an output signal through a low-pass filter 104 to a VCO 106, which applies an output signal, or sampling pulses, to the clock input terminal of the A/D converter 32. The output signal of the VCO 106 is also applied to the other input terminal of the phase comparator 102 through a variable frequency divider 108 having a frequency dividing ratio N.

With this arrangement, the VCO 106 oscillates at a frequency such that a number of sampling pulses, equal to the frequency dividing ratio N of the variable frequency divider 108, are contained in one period (1H) of the horizontal synchronizing signal.

For example, if the total number of horizontal pixels is 1088, then since the sampling frequency is 21.42 MHz as described above, the number of sampling pulses contained one period (1H) of the horizontal synchronizing signal, i.e., 63.49 μs, is 1360 as shown below:

$$\frac{63.49 \ \mu s}{1/21.42 \ MHz} = 1360.$$

The value of 1360 may thus be selected as the frequency dividing ratio N of the variable frequency divider 108. Actually, data with respect to frequency dividing ratios N to be given to the variable frequency divider 108, rather than the data in the table 42 shown in FIG. 3, which are to be applied to the D/A converter 28, are stored in a memory 26'. For example, the data $D_{23}$ should be stored as data corresponding to 1360.

The video signal processing device according to the present invention offers the following advantages:

The memory 26 or 26' stores data with respect to the frequencies of sampling pulses to be supplied to the A/D converter 32 depending on the numbers of scanning lines, the numbers of frames, and aspect ratios. Based on the data stored in the memory 26 or 26', analog video signals of various types transmitted from different video signal sources can therefore be easily converted to digital video signals having desired numbers of frames and aspect ratios.

According to the present invention, therefore, the video signal processing device allows an image output device to easily display or record image information in a single frame or a plurality of frames on a display unit such as CRT or a recording medium such as a heat sensitive medium.

Although certain preferred embodiments have been shown and described, it should be understood that many changes and modifications may be made therein without departing from the scope of the appended claims.

What is claimed is:

1. A video signal processing device for processing image information to be displayed in a single frame or a plurality of frames on a display unit or recorded in a single frame or a plurality of frames on a recording medium, said video signal processing device comprising:

A/D converting means for converting an analog video signal into a digital video signal with sampling pulses;

memory means for storing data for determining the total number of horizontal pixels along a single horizontal line in a frame based on the number of frames to be displayed on the display unit or recorded on the recording medium, and the aspect ratio of the frames, and data for determining the frequency of the sampling pulses supplied to the A/D converting means based on said total number of horizontal pixels and the number of scanning lines of the analog video signal; and processing means for supplying sampling pulses having said determined frequency to said A/D converting means based on the data stored in said memory means.

2. A video signal processing device according to claim 1, wherein said processing means includes a D/A converter for converting the data stored in said memory means into an analog voltage signal, and a voltage-controlled oscillator for generating the sampling pulses based on said analog voltage signal.

3. A video signal processing device according to claim 1, wherein said processing means comprises a PLL frequency synthesizer for generating the sampling pulses based on the data stored in said memory means.

* * * * *